United States Patent
Zauner et al.

(10) Patent No.: US 10,533,081 B2
(45) Date of Patent: Jan. 14, 2020

(54) CROSSLINKED THERMOPLASTIC ELASTOMERIC INSULATION

(71) Applicant: Armacell Enterprise GmbH & Co. KG, Schönefeld ot Waltersdorf (DE)

(72) Inventors: Christoph Zauner, Laer (DE); Bianca Fischer, Münster (DE)

(73) Assignee: ARMACELL ENTERPRISE GMBH & CO. KG, Schönefeld ot Waltersdorf (DE)

( * ) Notice: Subject to any disclaimer, the term of this patent is extended or adjusted under 35 U.S.C. 154(b) by 31 days.

(21) Appl. No.: 15/888,233

(22) Filed: Feb. 5, 2018

(65) Prior Publication Data

US 2018/0223064 A1    Aug. 9, 2018

(30) Foreign Application Priority Data

Feb. 6, 2017    (EP) .................................... 17154783

(51) Int. Cl.
| | | |
|---|---|---|
| *C08J 9/10* | (2006.01) | |
| *C08L 23/06* | (2006.01) | |
| *C08L 53/02* | (2006.01) | |

(52) U.S. Cl.
CPC .............. *C08J 9/103* (2013.01); *C08L 23/06* (2013.01); *C08L 53/025* (2013.01); *C08J 2203/04* (2013.01); *C08J 2205/00* (2013.01); *C08J 2207/00* (2013.01); *C08L 2201/02* (2013.01); *C08L 2207/066* (2013.01)

(58) Field of Classification Search
CPC ...... C08J 9/0061; C08J 9/103; C08J 2207/00; C08J 2205/00; C08J 2203/04; C08L 23/06; C08L 53/025; C08L 2201/02; C08L 2207/066
See application file for complete search history.

(56) References Cited

U.S. PATENT DOCUMENTS

| | | | | |
|---|---|---|---|---|
| 4,373,039 A | * | 2/1983 | Mueller et al. ............... | 523/205 |
| 4,410,648 A | * | 10/1983 | Kato et al. ............ | C08F 255/00 |
| | | | | 524/101 |
| 4,876,291 A | * | 10/1989 | allavia, Jr. et al. ...... | C08K 5/17 |
| | | | | 523/205 |
| 6,720,363 B2 | | 4/2004 | Subramonian et al. | |
| 2006/0194892 A1 | * | 8/2006 | Ramesh et al. ........ | C08J 9/0061 |
| | | | | 521/134 |
| 2006/0292357 A1 | * | 12/2006 | Cernohous et al. ....... | C08J 9/08 |
| | | | | 428/304.4 |
| 2007/0261878 A1 | | 11/2007 | Kosaka et al. | |
| 2011/0269858 A1 | | 11/2011 | Schips et al. | |
| 2016/0137801 A1 | * | 5/2016 | Zauner et al. ......... | C08J 9/0014 |
| | | | | 521/59 |
| 2016/0270987 A1 | * | 9/2016 | Stiehl et al. ............ | A61F 13/53 |

FOREIGN PATENT DOCUMENTS

| | | |
|---|---|---|
| EP | 1795552 A1 | 6/2007 |
| EP | 2450398 A1 | 5/2012 |
| EP | 2811489 A1 | 12/2014 |
| EP | 2824134 A1 | 1/2015 |
| KR | 100737720 B1 | 7/2007 |
| WO | 2009/029634 A2 | 3/2009 |

OTHER PUBLICATIONS

Search Report issued for European Application No. EP 17 15 4783 dated Jun. 1, 2017, 7 pages.

* cited by examiner

*Primary Examiner* — Nathan M Nutter
(74) *Attorney, Agent, or Firm* — Rothwell, Figg, Ernst & Manbeck, P.C.

(57) ABSTRACT

The present invention refers to an expanded polymeric material which consists of at least 150 phr, preferably at least 180 phr, but less than 500 phr ingredients in total, comprising 100 phr of at least two polymers, of which at least 40 phr is at least one polyolefin homopolymer and at least 20 phr is at least one styrene butadiene thermoplastic elastomer (TPE-s), the process of manufacturing such a material and the use of such a material.

20 Claims, No Drawings

CROSSLINKED THERMOPLASTIC ELASTOMERIC INSULATION

CROSS REFERENCE TO RELATED APPLICATION

This application claims the priority to European Application Number 17 154 783.9 filed Feb. 6, 2017, the disclosure of which is incorporated herein in its entirety by reference.

FIELD OF THE INVENTION

The present invention relates to a material for thermal and/or acoustic insulation comprising an expanded polymer (blend) based on at least one polyolefin and at least one styrene butadiene thermoplastic elastomer (TPE-s), the process of manufacturing such a material, and the use of such a material.

BACKGROUND OF THE INVENTION

Manifold solutions are available on the market for the insulation of mechanical equipment, such as in commercial and residential construction as well as industrial applications and the oil and gas industry.

Insulation products applied to heating and plumbing, HVAC (Heating, Ventilation and Air Conditioning) ducts and systems for commercial construction in non-residential buildings (such as hospitals, hotels and offices) as well as residential construction are mainly based upon polymeric foams. Light and heavy industry increase the use of such foams in plants, technical engineering facilities, trains and ships primarily for refrigeration, HVAC ducts and systems, coolants distribution and steam transportation equipment.

The reasons for choosing such materials are manifold: They are watertight and therefore prevent corrosion under insulation, have excellent thermal and acoustic insulation properties and they are easy to apply due to their flexibility, easy cuttability and bondability with one-component adhesives.

The polymeric insulation foams used for such applications comprise mainly two groups of materials, flexible elastomeric foams (FEFs) and polyethylene foams (PEFs).

Flexible elastomeric foams (FEFs) are flexible insulation materials with a high filler loading, achieved by a chemical expansion (foaming) process. Such materials are almost exclusively based on a narrow selection of polymer (elastomer) bases. The majority of such expanded materials are based upon NBR or NBR/PVC (e.g. NH/Armaflex®, AF/Armaflex®, K-Flex® ST, Kaiflex® KKplus) and EPDM (e.g. HT/Armaflex®, Aerocel® AC). Expanded EPDM is mainly used for higher temperature insulation, e.g. solar applications, whereas NBR is the most widespread polymer base for standard FEFs, such as in heating and plumbing and ventilation and cooling applications.

Due to the high loadings feasible with such materials, the product properties can be modified in a wide range, e.g. concerning flame resistance, thermal conductivity, mechanical properties, water vapour resistance etc. A disadvantage of such high loading is the higher density (>50 kg/m$^3$) compared to other polymeric foams (e.g. LDPE foams: 25 kg/m$^3$; Extruded polystyrene foams (XPS foams): 30 kg/m$^3$). In addition, the manufacturing of FEFs requires an additional kneading/mixing step previous to extrusion of the compound.

The second group of insulation materials, called polyethylene foams (PEFs), is made by physical expansion (foaming), using physical blowing agents. Such materials comprise a very low level of fillers on account of the fact that fillers lead to an overnucleation and therefore a collapse of the material. Due to the limited possibilities of loading such materials with fillers, plasticizers, etc., the possibilities of modifying their properties are very limited. Therefore, the flexibility of PEFs in comparison to FEFs is worse, leading to several disadvantages, e.g. due to a significantly higher amount of cuttings during installation, which is a drawback in terms of installation time and costs. In addition, the adhesion of PE (polyethylene) is in general difficult due to its low polarity, leading again to drawbacks in comparison to FEFs.

Besides, PEFs need a storage time of several weeks for outgassing the (usually flammable) blowing agents, while FEFs can theoretically be used directly after production. Last but not least, PEFs are only available as tubes, insulation sheets comparable to FEFs are not commercially available (FEF sheets: AF/Armaflex®: 3-50 mm; Kaiflex® KKplus: 3-50 mm). This is mainly caused by the low flexibility and therefore impossibility to bend and glue it around tubes, vessels, tanks, etc.

Several approaches were made to improve PEFs to create properties comparable to commercially available FEFs, especially concerning flexibility, adhesiveness and flame resistance/smoke suppression.

Some commercially available PEFs achieve a $B_L$-s1, d0 flame resistance classification according to EN 13501-1 ("SBI-Test") for tubes (e.g. Climaflex© from NMC), which is the best classification that can be achieved with organic materials. Unfortunately, such classification is limited to a wall thickness up to 13 mm. A wall thickness of 20 and 25 mm achieves only a $C_L$-s1, d0 classification.

The reason for such differences is obvious: The low filling capacity (limited by the aforementioned overnucleation) leads to a material comprising more than 95% of organic, which means flammable substances. Increasing the wall thickness of the material within the fire test (e.g. EN 13501-1) significantly increases the amount of flammable substances, leading to a drop in the fire classification (from B to C). This means, that the flame resistance of such materials can only be achieved with low densities and limited wall thicknesses. However, such low wall thickness are of declining interest for the current demands concerning insulation thickness, e.g. according to the German EnEV (Energie-Einspar-Verordnung).

Such a drop in fire classification also leads to another risk using such materials: Density variations can easily lead to a drop in the fire classification and the use of large quantities of such insulation materials entails the risk of a fire.

Such a risk does not exist when using FEFs, e.g. Armaflex© Ultima. That material has a $B_L$-s1, d0 classification for the whole product range (9-25 mm wall thickness). The reason for such differences is based upon the significantly higher loading that is possible for such a product. Modifications of fire resistance are feasible in a wider range using fillers, flame retardants, additives, etc. Variations in densities therefore also have a negligible effect on flame resistance.

The poor flexibility of PEFs is another important drawback of such products. Several attempts were made to develop products with improved bendability and elasticity. EP1336064 claims a thermal insulation polyethylene foam comprising metallocene polyethylene with improved flexibility. Unfortunately, the composition needs to comprise at least 77% of metallocene polyethylene, which is significantly more expensive than common non-metallocene low density PEs (LDPEs) used for PEFs. Furthermore, the flexibility of such foams is still not comparable to FEFs. Similarly EP1645589 describes a flexible cross-linked polyethylene foam which is modified by metallocene polyethylene. Beside metallocene PE, ethylene copolymers may be used to further improve the flexibility of such foams (for example U.S. Pat. No. 6,872,756, CA2230093 and U.S. Pat. No. 5,059,631). Unfortunately, such copolymers either have a high copolymer (VA, vinyl acetate) content and therefore a negative impact on temperature resistance (ethylene-vinyl acetate (EVA) with VA content of 40 wt % (percent by weight): $T_g$<50° C.) or have a low copolymer content and therefore a very limited or almost no impact on the flexibility of the resulting foam (e.g. VA content of 15 wt %: $T_g$<90° C., Vicat softening point<70° C.). Moreover, even such materials with a low VA content decrease the overall temperature resistance.

Other ethylene copolymers show a comparable temperature behaviour like EVA, therefore such approaches either significantly decrease the temperature resistance and/or have almost no impact on flexibility of the resulting foam.

Beside polyolefin based polymers and copolymers, also styrene containing thermoplastic elastomers have been used to obtain softer foams. For example EP1795552, U.S. Pat. Nos. 6,653,360 and 9,260,578 describe a polyolefin based foam which is modified with a styrene-elastomer block copolymer and a plasticizer oil. The plasticizer oil is required to process the styrene-elastomer with the polyolefin and only a low amount of filling is possible. US2015/0225526 on the other hand describes a soft foam based on linear low density polyethylene (LLDPE) and an additional polymer which improves flexibility.

The disadvantage of all the prior teaching is the poor flame resistance, relatively high cost due to limitations in filling capability, significantly higher densities (excluding the material for application as an insulation foam), the use of plasticizers (drawbacks regarding migration, flammability, etc.) and the discontinuous shaping, crosslinking and foaming process.

Physically foamed and highly filled polypropylene based foams have been widely described in prior art (EP1449868, EP1512713 and U.S. Pat. No. 8,846,774), however no-one has managed until now to combine chemical foaming and coinciding crosslinking of highly filled and fire retardant polyethylene and TPE-s compounds for low density foams. US2016009885 and U.S. Pat. No. 6,110,985 describe highly filled polyolefin and rubber foams using chemical blowing agents, but their work indeed shows that achieving low densities is challenging. Even though the densities are not mentioned, the amount of chemical blowing agent (<10%) that is used is far too low to achieve densities as low as presented in this invention.

SUMMARY OF THE INVENTION

Therefore, it would be favourable to combine the advantages of PEFs and FEFs. Due to this, a major objective of the present invention is to provide a low cost, versatile polyolefin based product, having low densities like PEFs as well as the flexibility and filling capacity of FEFs.

A further objective of this invention is avoid the additional kneading/mixing step prior to extrusion in the manufacturing process of FEFs. Preferably, such a product should be crosslinked, e.g. for better mechanical properties (e.g. elasticity, scratch resistance, etc.) as well as improved aging resistance. Furthermore, the fire classification according to EN 13501-1 should be independent from the wall thickness (3-25 mm).

Surprisingly, it has been found that such a versatile material not showing the individual disadvantage of FEFs and PEFs can be achieved by expanding and crosslinking a polymer (blend) comprising at least one polyolefin and at least one TPE-s. The material furthermore comprises at least one crosslinking agent, at least one chemical blowing agent, at least one filler and optionally further additives to fulfil modern regulations and approvals in the respective field of application.

The present material comprises at least one layer of expanded polymer (blend). All quantities concerning the present material are related to a total of 100 phr of polymer content. The total amount always comprises the aforementioned 100 phr of the polymer.

The overall quantities of all ingredients sum up to at least 150 phr, preferably at least 180 phr, but less than 500 phr. Such quantities include the amount of chemical blowing agent, although this agent decomposes during processing. This means that the polymer content related to the overall quantity of all ingredients is ≤66.7 wt %, preferably ≤55.6 wt %, but ≥20.0 wt %. The given percentages are rounded to the first decimal place.

A higher polymer content shows several drawbacks, e.g. worse fire performance, while a lower polymer content e.g. decreases the water vapour resistance, flexibility and mechanical resistance of the present material.

The 100 phr of the polymer content comprise at least 40 phr of at least one polyolefin homopolymer, preferably a polyethylene (PE) homopolymer, especially preferred a low density polyethylene homopolymer (LDPE) and at least 20 phr of at least one TPE-s. The at least one polyolefin homopolymer and at least one TPE-s sum up to at least 80 phr.

The polyolefin homopolymer, preferably the LDPE has a melt flow rate (MFR) of <5 g/10 min, preferably <3 g/10 min at 190° C. and 2.16 kg (according to ISO 1133). Such low MFR values ensure high melt strength and melt extensibility required for low density foams (prevention of cell fracture and cell coalescence during expansion caused by decomposition of the blowing agent).

The TPE-s is a linear or branched, diblock or triblock, styrene copolymer, preferably a linear styrene triblock copolymer (i.e., in the context of the present invention, a share of triblock material>65% and ≤35% diblock material). The triblock material shows a higher strength, resulting from the extensive network formed as the styrene blocks congregate into domains. The use of the aforementioned smaller amounts (≤35%) of diblock within the triblock material can improve the processability (less shear during extrusion). The TPE-s is at least one styrene-butadiene-styrene block copolymer (SBS), styrene-ethylene/butylene-styrene block copolymer (SEBS), styrene-isoprene-styrene block copolymer (SIS), styrene-isobutylene-styrene block copolymer (SIBS), styrene-isoprene-styrene block copolymer (SIPS), styrene-propylene-styrene block copolymer (SPS), styrene-ethylene/propylene-styrene block copolymer (SEPS) or styrene[ethylene-(ethylene-propylene)]-styrene block copolymer (SEEPS).

In view of the high flexibility of the resulting material, TPE-s grades of low polystyrene content are preferred. The use of small amounts of such grades already leads to a significant increase of the material's flexibility. Therefore, the polystyrene content is ≤35 wt %, preferably ≤25 wt %, especially preferred ≤20 wt % according to ASTM D5775. Preferred are SBS, SIS and their hydrogenated versions SEBS and SEPS. Such TPE-s show the best compatibility, processability and toughening effect within the present material. Especially preferred are SEBS and SEPS due to their better ageing resistance (ozone, UV, oxygen), temperature resistance and chemical resistance in comparison to SBS and SIS.

Additionally, the polymer content of the present material may comprise all kind of elastomers or thermoplastic elastomers, like—but not restricted to—ACM/AEM (arylic elastomers), AU/EU (polyurethanes), BR (butadiene rubber), BIIR (bromobutyl rubber), CIIR (chlorobutyl rubber), CM (chlorinated polyethylene), CSM (chlorosulfonated polyethylene), (G)(E)CO (epichlorohydrin elastomers), EP(D)M (ethylene propylene (diene) rubber), EVM (ethylene/vinylacetate copolymers), SBR (styrene butadiene rubber), (H)NBR ((hydrogenated) nitrile butadiene rubber), FKM/F (E)PM (fluoroelastomers), GPO (propylene oxide rubber), IR (isoprene rubber), IIR (isobutylene isoprene rubber), (V)MQ (silicone rubber), NR (natural rubber), T (polysulfide rubber). Furthermore, the claimed material may comprise further polymers like—but not limited to—CPE (chlorinated polyethylene), PP (polypropylene), PET (polyethylene terephthalate), PBT (polybutylene terephthalate), PC (polycarbonate), PS (polystyrene), PA (polyamide), PU (polyurethane), PTFE (polytetrafluoroethylene), PMMA (polymethyl methacrylate) etc.

The present material may further comprise at least 20 phr, preferably at least 40 phr of at least one inorganic filler.

The inorganic filler may be an aluminium or magnesium compound, such as aluminium silicates, oxides, hydroxides etc., e.g. ATH (aluminium hydroxide), and/or calcium based, such as calcium carbonates, sulfates, etc., e.g. calcium carbonate and/or a silicon based compound, such as silicates, quartz, zeolites etc., or mineral based accordingly, e.g. on gypsum, clay, perlite, vermiculite, chalk, slate, graphite, talc/mica etc., or any mixtures thereof. Preferred are inorganic, inactive (non-reinforcing) fillers due to their low impact on material viscosity. Such fillers are defined by a surface area≤20 $m^2/g$, preferably ≤10 $m^2/g$ according to BET (DIN ISO 9277). A surface area>20 $m^2/g$ leads to a significant increase and therefore impossibility to foam the material when using more than 20 phr, while the use of fillers having a surface are ≤10 $m^2/g$ enables the use of significantly higher amounts of fillers (≥40 phr). Especially preferred are aluminum and/or magnesium hydroxides and calcium carbonates due to their flame-retarding effect by releasing water, carbon dioxide and/or carbon monoxide at temperatures≥200° C.

The present material may additionally comprise at least one crosslinking system, preferably a peroxide crosslinking system. Such system comprises at least one peroxide, preferably dicumyl peroxide. The crosslinking system may further comprise coagents like TAC (triallyl cyanurate), TAIC (triallyl isocyanurate), multifunctional acrylate and methacrylate esters, dimaleimides and/or zinc salts of acrylic and methacrylic acid to increase the rate and/or the state of cure. Additionally, the crosslinking system may comprise at least one additional peroxide, preferably a peroxide with a higher crosslinking temperature compared to dicumylperoxide—e.g. di-tert.-butyl peroxide and/or 2,5-dimethyl-2,5-di(tert-butylperoxy)-3-hexyne—to increase the crosslinking density and stabilize the foam structure after the expansion.

Furthermore, the present material may comprise at least one chemical blowing agent (e.g. releasing carbon dioxide, nitrogen, oxygen or water) chosen from the classes of organic blowing agents and/or inorganic blowing agents. Preferred are organic blowing agents of nitroso type, azo type and/or aromatic hydrazide type, especially preferred are azo type blowing agents like azodicarbonamide. The amount of blowing agent has to be >11% wt., preferably >13% wt. Such a high amount of blowing agent leads to the required low densities of <40 $kg/m^3$, preferably <35 $kg/m^3$, especially preferred <30 $kg/m^3$. Such low densities are necessary to achieve the targeted flame resistance (due to a low fire load) and low thermal conductivity (insulation properties).

The present material may further comprise at least 5 phr, preferably at least 10 phr of chlorinated or brominated flame retardants, preferred are flame retardants having a glass transition temperature, softening point or melting point<200° C., preferably <160° C., especially preferred <120° C., e.g. chlorinated paraffins and/or tetrabromobisphenol A bis(dibromopropyl ether), especially preferred are polymeric flame retardants like brominated polyphenyl ether or brominated epoxy polymers. The softening or melting of the material prior to decomposition of the blowing agents leads to a lower viscosity during expansion. Such lower viscosity leads to a lower density of the final present material and/or enables the use of higher levels of fillers due to the contrary effect on viscosity between filler and aforementioned flame retardants.

Polymeric flame retardants are preferred to other flame retardants, as they are beneficial for the melt strength or, at least, do not have a negative impact on melt strength. This finally leads to lower densities of the present materials comprising polymeric flame retardants in comparison to the present materials comprising non-polymeric flame retardants.

Alternatively, the present material may comprise halogen-free flame retardants, preferably phosphorous based flame retardants, to achieve a flame retardant and halogen free product as required for some applications, e.g. in marine environments as well as railway applications. The phosphorous content of the flame retardant should be >15 wt %, preferably >20 wt %. Preferred are phosphonates or polyphosphonates, especially preferred in combination with hindered amines, e.g. Flamestab® NOR 116 (1,3-Propanediamine, N,N-1,2-ethanediylbis, reaction products with cyclohexane and peroxidized N-butyl-2,2,6,6-tetramethyl-4-piperidinamine-2,4,6-trichloro-1,3,5-triazine reaction products). Such combinations improve the fire retardant properties already at lower concentrations compared to using phosphonates solely.

The present material may comprise at least one synergist for the halogenated flame retardants, e.g. antimony trioxide, zinc stannate, zinc hydroxystannate, 2,3-Dimethyl-2,3-diphenylbutane, bismuth oxychloride etc. Preferred are antimony (Sb) and/or zinc (Zn) based materials, especially preferred are antimony trioxide and/or zinc stannate. A synergist increases the efficiency of the flame retardants in the reaction to fire in terms of smoke suppression and/or heat release. Depending on the grade of the desired flame protection, only combinations of a synergist and conventional fire retardants can achieve the desired results. When using antimony trioxide in combination with halogenated flame retardants, the highest level of flame retardancy can be achieved, while the use of zinc stannate leads to less smoke development. The weight ratio between flame retardant and synergist is from 10:1 to 1:1, preferably from 6:1 to 2:1. Such ratio gives the best balance between smoke suppression, flame protection and costs.

The present material furthermore may comprise a heat and/or reversion stabilizer system. The stabilizers can be chosen from the classes of carbon blacks, metal oxides (e.g. iron oxide) and hydroxides (e.g. magnesium hydroxide), metal organic complexes, radical scavengers (e.g. tocopherol derivates), complex silicates (e.g. perlite, vermiculite), and combinations thereof.

The present material may also comprise (<10 phr related to the polymer content) of at least one plasticizer. Preferably, the material does not comprise any plasticizer to prevent bleeding and evaporation. If the use of plasticizers is indispensable (e.g. to fulfil special regulations or requirements or to adjust the viscosity), the plasticizer should not have a negative impact on flame retardancy. Therefore, preferred plasticizers are phosphate plasticizers or chlorinated plasticizers or mixtures thereof. The chlorinated plasticizers are preferably chlorinated paraffins and/or chlorinated fatty acid substituted glycerines and/or chlorinated alpha-olefins having a chlorine content of at least 20 wt %, preferably at least 30 wt %, especially preferred at least 45 wt % according to DIN 53474, especially preferred are long chain chlorinated plasticizers (LCCPs) with C>17. Such highly chlorinated, long chain materials have the greatest fire retardant impact and are—in contrast to short or medium chain chlorinated plasticizers—not persistent, bio-accumulative or toxic.

The phosphate plasticizers can be aliphatic, chloroaliphatic or aromatic phosphoric acid esters or any combinations thereof. Preferred are phosphoric acid esters of high phosphorous content and low smoke development; especially preferred is diphenyl 2-ethylhexyl phosphate (DPO) due to its marginal smoke emission, low viscosity and low temperature resistance.

Additionally, the present material may comprise synergists, biocides, stabilizers (e.g. versus UV, ozone, reversion etc.), dyes etc., of any kind in any ratio, including additives for improving its manufacturing, application and performance properties, such as inhibitors, retarders, accelerators, etc.; and/or additives for adapting it to the application needs, such as char-forming and/or intumescent additives, like expanding graphite, to render the material self-intumescent in case of fire, e.g. for general protection purposes and/or to close and protect e.g. wall and bulkhead penetrations; and/or substances that will lead to a self-ceramifying effect of pipes, wall penetrations etc. in case of fire, such as boron compounds, silicon containing compounds etc.; and/or internal adhesion promoters to ensure self-adhesive properties in co-extrusion and co-lamination applications, such as silicate esters, functional silanes, polyols, etc.

All of the aforementioned ingredients show easy mixing and good dispersion in a wide range of dosage.

The present material can be mixed by standard methods widespread in the plastics industry, preferred is mixing in an extruder due to the possibility of mixing and shaping the present material to sheets and tubes in one step (no prior compounding step necessary, as e.g. required for FEFs). Afterwards, such sheets and tubes can directly be run continuously through a hot air oven, salt bath etc. Preferred are hot air ovens, because in the case of a salt bath, additional cleaning steps are necessary.

The present material can be expanded and crosslinked to a density<40 kg/m$^3$, preferably <35 kg/m$^3$, especially preferred <30 kg/m$^3$ according to DIN EN ISO 845. Densities of <35 kg/m$^3$ and in particular <30 kg/m$^3$ are preferred as they lead to lower thermal conductivity and lower costs due to less material consumption.

A major advantage of the present material is the combination of benefits of FEFs as well as PEFs. The achievable, low densities are comparable to PEFs, leading to lower material usage and therefore lower costs for the final product. In parallel, the flexibility, cuttability and bondability are comparable to FEFs, leading to a fast and easy applicability during installation. Thus, the costs advantages of the material itself and its installation can be combined in one product. The low densities can be achieved due to the high gas tightness in combination with a high melt strength of the polymers.

A prominent advantage of the present material is the suitability for applications where low flame spread and low smoke generation are required. The present material is classified as Class A (25/450), preferably as 25/50 according to ASTM E84/CAN ULC S 102, which is the required classification for building and construction in the US and Canada. Different classification levels are achievable according to EN ISO 13823, depending on the use and ratio of fillers, flame retardants, synergists etc. The present material is at least classified as $D_L$-s3,d0, but also $C_L$-s3,d0 classifications or $B_L$-s2,d0 are feasible. All aforementioned classifications can be achieved for both tubes and sheets without additional covering, coatings, or the like.

A major advantage is the excellent suitability of the present material for thermal and acoustic insulation applications. According to DIN EN ISO 8497/DIN EN 12667, the material achieves a thermal conductivity ($\lambda$ value) of ≤0.040 W/m*K @ 0° C. Due to the low densities that can be realized, the thermal conductivity can be decreased to ≤0.035 W/m*K at 0° C. when achieving densities<35 kg/m$^3$.

It is an important advantage of the present material that it provides easy mounting due to its high flexibility. Its ability of reversible elongation of at least 25%, preferably at least 50% of the original length and its elongation at break of at least 50%, preferably at least 100% (according to DIN EN ISO 1798) of the original length allows it to be mounted on tightly bent piping without further cutting.

It is a prominent advantage of the present material that it can easily be glued with standard polychloroprene based contact adhesives, acrylate and/or styrene block copolymer based pressure sensitive adhesives (PSAs) and/or hot melt adhesives which leads to air and water tight sealings.

The present material exhibits high water vapor transmission (WVT) values of ≥2.000, preferably ≥5.000 according to EN 13469/EN 12086. Therefore, the material can be used for low temperature insulation (<0° C.), because the object to be insulated is well protected from under insulation corrosion (UIC) through condensation of humidity.

It is an advantage that the present material has a high degree of closed cells, determined by a vacuum water absorption of <5.0%, preferably <2.5% according to ASTM D 1056.

Another advantage of the present material is the excellent UV, aging and weathering resistance. The material can be used for outdoor applications without any additional covering or coating.

A further advantage of the present material is its significantly lower post-production shrinkage compared to FEFs, caused by rapid hardening and crystallisation during cooling after leaving the ovenline.

It is a prominent advantage of the present material that the viscosity significantly decreases during crosslinking/expansion due to the melting of the polyethylene and the TPE-s and thus absorbs excess enthalpy created by the exothermic expansion process. This leads to a very stable, tolerant and robust manufacturing process.

A basic advantage of the present material is its versatility regarding its properties due to manifold possibilities of using fillers, plasticizers, flame retardants, additives, crosslinkers, etc. in various amounts and combinations. The aforementioned ingredients show easy mixing and good dispersion in a wide range of dosage.

Another advantage of the present material is its versatility regarding the production equipment. It can be produced in an economic way in a continuous process, e.g. by extrusion, extrusion and co-lamination or direct co-extrusion. The material can also be laminated, moulded, co-moulded, over-moulded, welded etc. directly as mono- or multilayer system and thus it can be applied in unrestricted shaping onto various surfaces in automotive, transport, aeronautics, building and construction, marine and offshore, furniture, machinery engineering and many other industries, even by thermoforming or other shaping methods. The present material can particularly be manufactured in the form of tubes and sheets in a continuous process with varying wall thickness and inner diameter; most suitable is a wall thickness between 3 and 50 mm.

EXAMPLES

The following examples and comparative examples have been produced in a two-step production process, comprising:
1. mixing and shaping in an extruder and
2. expansion and crosslinking in a hot air oven line.

The extrusion has been performed on a single screw vacuum extruder providing raw unexpanded sheets and tubes. Those sheets and tubes have been crosslinked and expanded simultaneously in a hot air oven cascade of three ovens to sheets of 25 mm wall thickness and tubes of 25 mm wall thickness and 22 mm inner diameter.

Table 1 lists the raw materials used for the components.

TABLE 1

| Raw materials | | |
|---|---|---|
| Chemical Name | Trade Name | Supplier |
| LDPE | DOW ® LDPE 450E | DOW ® Chemical Company |
| SEBS | Kraton ® G 1657 M | Kraton ® Polymers |
| SEPS | Septon ® 2004 | Kuraray Europe GmbH |
| Magnesium hydroxide | Magnifin ® H5 | Martinswerk GmbH |
| Calcium carbonate | Hubercarb ® M6 | Huber Carbonates, LLC |
| Dicumyl peroxide | Luperox ® DCP | Safic-Alcan |
| Azodicarbonamide | Microfine ® ADC-3202 | HPL Additives Limited |
| Tetrabromobisphenol A | AP1968 | Everkem srl |
| Phosphonate | SMC 688 | Special Materials Company |
| Hindered amine | Flamestab ® NOR 116 | BASF SE |
| Antimony trioxide | Triox ® | Produits Chimiques de Lucette |
| Zinc stannate | ZB 467 | Great Lakes Solutions |

Table 2 gives an overview about the tested materials, available product range and their basic make-up. Apart from Climaflex® (26×024, means wall thickness of 26 mm and inner diameter of 24 mm), all materials were available as tubes in 25 mm wall thickness and 22 mm inner diameter. Climaflex® and Tubolit® DG-B1 were not available as sheets. Materials marked with an "*" are comparative examples, the other materials are innovative examples.

TABLE 2

| Comparative and innovative examples | | | | |
|---|---|---|---|---|
| No. | Name | Polymer | Material group | Range |
| 1* | Kaiflex ® KKplus | NBR/PVC | FEF | Tubes & sheets |
| 2* | Aerocel ® AC | EPDM | FEF | Tubes & sheets |
| 3* | Climaflex ® | LDPE | PEF | Tubes only |
| 4* | Tubolit ® DG-B1 | LDPE | PEF | Tubes only |
| 5* | — | LDPE | — | Tubes & sheets |
| 6* | — | LDPE/SEBS | — | Tubes & sheets |
| 7* | — | LDPE/SEBS | — | Tubes & sheets |
| 8 | — | LDPE/SEBS | — | Tubes & sheets |
| 9 | — | LDPE/SEBS | — | Tubes & sheets |
| 10 | — | LDPE/SEPS | — | Tubes & sheets |

TABLE 3

| Make-up of the innovative examples and comparative examples 5, 6 and 7. | | | | | | |
|---|---|---|---|---|---|---|
| | 5* | 6* | 7* | 8 | 9 | 10 |
| LDPE | 100 | 90 | 70 | 70 | 60 | 70 |
| SEBS | | 10 | 30 | 15 | 40 | |
| SEPS | | | | 15 | | 30 |
| Magnesium hydroxide | | | | | 35 | 10 |
| Calcium carbonate | | | | 40 | 10 | 40 |
| Dicumyl peroxide | 1 | 1 | 1 | 1 | 1 | 1 |
| Azodicarbonamide | 18 | 18 | 18 | 26 | 27 | 30 |
| Tetrabromobisphenol A | | | | 15 | | 20 |
| Phosphonate | | | | 20 | | |
| Hindered amine | | | | | 2 | |
| Antimony trioxide | | | | 3 | | 1 |
| Zinc stannate | | | | | 3 | 3 |
| Σ | 119 | 119 | 119 | 185 | 198 | 205 |

(unit: phr)

Table 4 presents the physical and flammability test results of the different materials. The SBI test has been performed on tubes, ASTM E84 tests have been performed on sheets (if available). Flexibility of the different materials was compared for the same wall thickness and classified from 1 (best flexibility and bendability) to 5 (worst flexibility and bendability).

TABLE 4

| | Technical performance/test results | | | | | | |
|---|---|---|---|---|---|---|---|
| No. | Density [kg/m³] DIN EN ISO 845 | Flexibility [rating]* | SBI [tubes, 25x022] EN 13501-1 | temperature application range [tubes] EN 14707/EN 14313 | λ [W/m*K at 0° C.] DIN EN ISO 8497 | WVT value EN 13469 | Fire classification [sheets] ASTM E 84 |
| 1* | 52 | 1 | $B_L$-s3, d0 | −50° C.-110° C. | 0.033 | 10.000 | 10/250 |
| 2* | 56 | 2 | $D_L$-s2, d0 | −50° C.-150° C. | 0.035 | 5.000 | 25/50 |
| 3* | 27 | 4 | $C_L$-s1, d0 | 0° C.-100° C. | 0.036 | — | — |
| 4* | 25 | 5 | $D_L$-s3, d0 | 0° C.-100° C. | 0.044 | 2000 | — |
| 5* | 33 | 5 | E | — | 0.040 | 2000 | 60/20 |
| 6* | 30 | 4 | E | — | 0.039 | 3000 | 55/25 |
| 7* | 29 | 2 | E | −50° C.-110° C. | 0.038 | 3000 | 50/20 |

TABLE 4-continued

| | | | | Technical performance/test results | | | |
|---|---|---|---|---|---|---|---|
| No. | Density [kg/m$^3$] DIN EN ISO 845 | Flexibility [rating]* | SBI [tubes, 25x022] EN 13501-1 | temperature application range [tubes] EN 14707/EN 14313 | $\lambda$ [W/m*K at 0° C.] DIN EN ISO 8497 | WVT value EN 13469 | Fire classification [sheets] ASTM E 84 |
| 8 | 26 | 2 | D$_L$-s2, d0 | −50° C.-110° C. | 0.035 | 5000 | 25/45 |
| 9 | 28 | 1 | CL-s1, d0 | −50° C.-110° C. | 0.034 | 7000 | 20/15 |
| 10 | 24 | 1 | BL-s2, d0 | −50° C.-120° C. | 0.033 | 8000 | 15/40 |

*1 = best, 5 = worst flexibility

The invention claimed is:

1. An expanded polymeric material which consists of at least 150 phr, but less than 500 phr ingredients in total, comprising 100 phr of at least two polymers, of which at least 40 phr is at least one polyolefin homopolymer and at least 20 phr is at least one styrene-containing thermoplastic elastomer, wherein the material has a density of <40 kg/m$^3$ according to DIN EN ISO 845.

2. The material according to claim 1, wherein the at least two polymers comprise at least 80 phr of a combination of the at least one styrene-containing thermoplastic elastomer and the at least one polyolefin homopolymer.

3. The material according to claim 1, wherein the polyolefin homopolymer is at least one polyethylene homopolymer.

4. The material according to claim 3, wherein the polyolefin homopolymer has a melt flow rate of <5 g/10 min at 190° C. and 2.16 kg according to ISO 1133.

5. The material according to claim 1, wherein the styrene-containing thermoplastic elastomer is at least one linear styrene block copolymer.

6. The material according to claim 5, wherein the styrene-containing thermoplastic elastomer has a polystyrene content≤35% wt. according to ASTM D5775.

7. The material according to claim 1, which is crosslinked by a crosslinking system.

8. The material according to claim 1, comprising at least 20 phr of at least one inorganic filler having a surface area≤20 m$^2$/g according to BET (DIN ISO 9277).

9. The material according to claim 8, wherein the inorganic filler releases water and/or carbon dioxide and/or carbon monoxide at temperatures above 200° C.

10. The material according to claim 1, comprising at least one chlorinated and/or brominated flame retardant.

11. The material according to claim 10, wherein the flame retardant is at least one polymeric flame retardant.

12. The material according to claim 10, comprising at least one synergist for the flame retardants.

13. The material according to claim 1, which has a density of <35 kg/m$^3$ according to DIN EN ISO 845.

14. An expanded polymeric material which consists of at least 150 phr, but less than 500 phr ingredients in total, comprising 100 phr of at least two polymers, of which at least 40 phr is at least one polyolefin homopolymer and at least 20 phr is at least one styrene butadiene thermoplastic elastomer, which has a closed cell structure of <5.0% determined by vacuum water absorption according to ASTM D 1056.

15. The material according to claim 1, having a water vapor transmission value of ≥2000 according to EN 13469/EN 12086.

16. A process for manufacturing the material according to claim 1, wherein the polymeric material is expanded by decomposition of a chemical blowing agent, wherein the amount of the chemical blowing agent is higher than 11% wt.

17. The material according to claim 1, which is flame retardant according to ASTM E84/CAN ULC S 102 requirements for Class A (25/450).

18. A thermal and/or acoustic insulation sheet or tube comprising the expanded polymeric material of claim 1.

19. The material of claim 1, which has a closed cell structure of <5.0% determined by vacuum water absorption according to ASTM D 1056.

20. The material of claim 14, which has a density of <40 kg/m$^3$ according to DIN EN ISO 845.

* * * * *